Sept. 26, 1944.    H. R. ELLINWOOD    2,359,209
CLIP FOR SUPPORTING CONDUITS
Filed Aug. 18, 1942
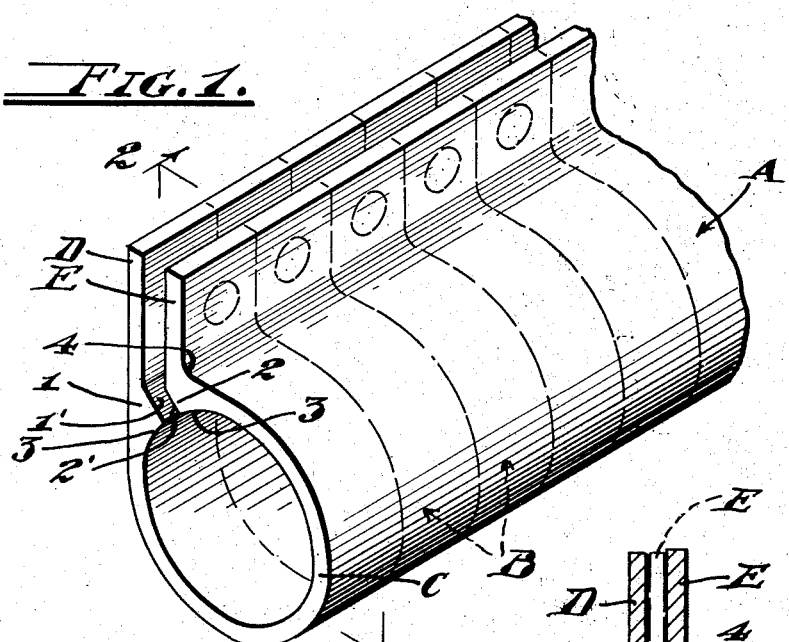
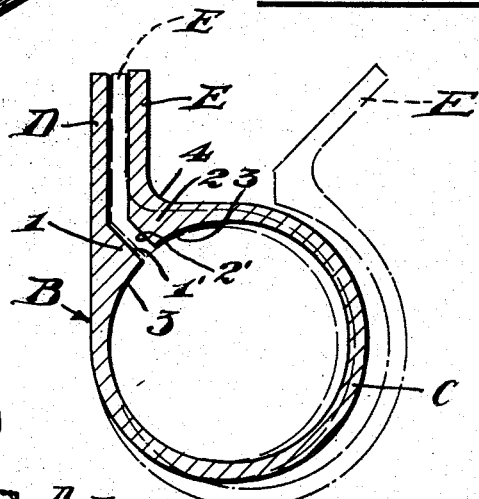
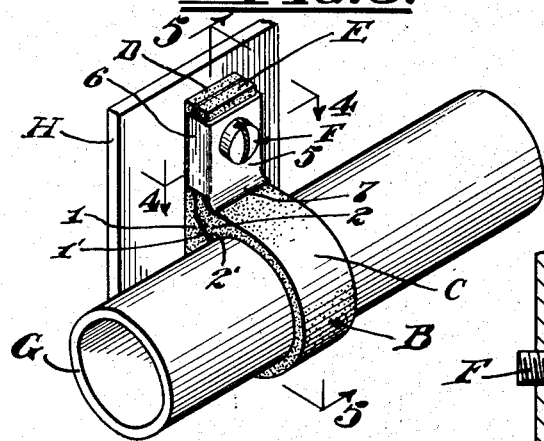
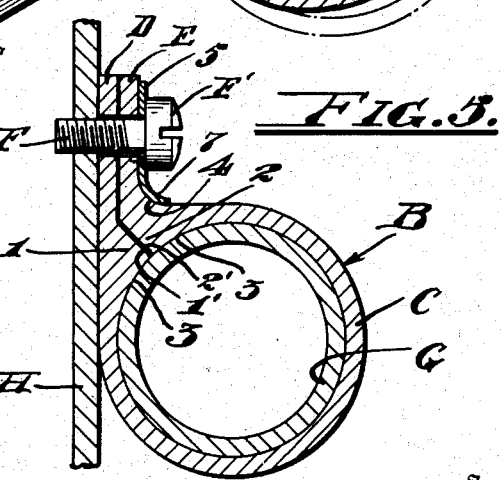
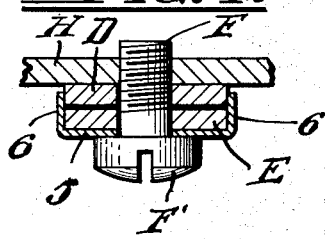
Inventor
Herman Ray Ellinwood
By R. S. Berry
Attorney Patented Sept. 26, 1944

2,359,209

UNITED STATES PATENT OFFICE 2,359,209

CLIP FOR SUPPORTING CONDUITS

Herman Ray Ellinwood, Burbank, Calif., assignor to Adel Precision Products Corp., a corporation of California Application August 18, 1942, Serial No. 455,194

3 Claims. (Cl. 248—74)

This invention relates to clips for supporting conduit lines in aircraft and the like.

Heretofore conduit supporting clips have been made of a metal strap formed into a conduit-embracing loop and provided with apertured terminals adapted to be secured to the metallic frame structure of the airplane. A cushion of resilient insulation material, preferably synthetic rubber is mounted on the metal strap to line the loop portion as a vibration-absorbing seat for the conduit. A bonding strip of metal is electrically connected with the metal strap and overlies the cushion so as to contact the conduit whereby the conduit is "grounded" to metal structure of the airplane through said strip and the ends of the strap in contact with said metal structure, to harmlessly discharge static electricity from said conduit.

An object of the present invention is to provide a conduit supporting clip in which the strap is made of non-metallic and insulation material such as a hard or semi-hard plastic or similar material for the purpose of conserving strategic metals and synthetic rubber during the present war, as well as simplifying the construction and method of making the clip and reducing the number of parts, the weight and the cost of the clip.

An important object of this invention is to provide a clip of the character described which may be conveniently extruded in the form of a tube having the desired clip cross section and construction, from which tube the finished clips are readily cut, thereby simplifying and reducing the method and cost of manufacture as well as facilitating an increased output in a comparatively short time.

Another object is to provide a clip of the character described which may or may not include a cushion and a bonding means, it being possible to use the bonding means to the exclusion of the cushion or vice versa.

A further object is to provide a clip such as described wherein the plastic strap is formed with novel and efficacious reinforcing portions at the junctures of the apertured ends and the loop portion of the strap, such portions being adapted to abut and resist strains and stresses to increase the life of the clip and its effectiveness as a conduit support.

Yet another object is to provide in a clip of the character described a novel metallic plate-like washer adapted to lie against the outermost apertured end of the strap for contact with the head of the screw or bolt and having side flanges which embrace the longitudinal edges of the portions of the strap to brace them and hold them in alignment.

With the foregoing objects in view together with such other objects and advantages as may subsequently appear, the invention resides in the parts and in the combination, construction and arrangement of parts hereinafter described and claimed, and illustrated by way of example in the accompanying drawing in which:

Fig. 1 is a perspective view showing an extruded plastic tube having the desired clip cross section in accordance with my invention, the dotted lines indicating how the clips are cut from the tube, in finished form.

Fig. 2 is a sectional view taken on the line 2—2 of Fig. 1 showing in dotted lines how the clip may be opened.

Fig. 3 is a perspective view of the clip as when in use.

Fig. 4 is a sectional view taken on the line 4—4 of Fig. 3.

Fig. 5 is a sectional view taken on the line 5—5 of Fig. 3.

Referring more specifically to the drawing A designates a tube of extruded plastic or similar non-metallic material having the desired clip cross section in accordance with this invention and making possible the cutting of the tube into proper lengths to define clips such as the one B with each clip in the form of a flexible strap including a loop portion C and straight end portions D and E extending tangentially from the loop portion. These end portions are apertured and adapted to receive a fastening F for holding the clip on a metal conduit G as well as for securing the clip to a structural part of an aircraft or the like, as indicated by the part H in Fig. 3.

The material of which clip hereof is made may be any suitable semi-hard or hard non-metallic material which may be extruded to form the bendable and flexible clips in the manner here shown and described. Tenite or a similar plastic may be used or in fact any plastic which may be extruded to form a clip as here shown and which is bendable and flexible and somewhat resilient and has sufficient strength to be tightly clamped on a conduit and afford a reliable insulated support therefor when secured to the frame structure of the aircraft.

As here shown the clip is extruded and formed so that inwardly extending fillets or enlarged reinforcing portions 1 and 2 are provided at the junctures of the end portions and the loop portion of the clip. These enlargements have opposed flat surfaces 1' and 2' extending angularly and substantially radially relative to the loop portion, said faces being adapted to abut along substantially the mid-width of the thickened part of the clip when the end portions are brought together to clamp the clip on the conduit.

It should be noted that the clips are formed and tensioned so that the opposed ends D and E as well as the opposed faces 1' and 2' are spaced apart. This facilitates the opening of the clip by spreading said ends apart as shown in dotted lines in Fig. 2 to permit of mounting the clip on the conduit. In this connection it should be understood that while in most instances the clip may be tensioned and have some resiliency it will in all cases be flexible to the extent that it may be opened and applied to the conduit and then either bent or forced back into conduit-embracing position with the faces 1' and 2' of the reinforcing portions 1 and 2 and the opposed faces of said ends in contact as shown in Fig. 5.

Each of the enlargements 1 and 2 is thicker than the remainder of the strap and is provided with a curved face 3 conforming to the conduit and in contact therewith.

A curved face 4 is defined on the outer surface of enlargement 2 where it joins the straight end portion E, whereas the outer face of enlargement 1 is straight and coplanar with the outer face of the end portion D. In securing the ends D and E by means of the fastening F as shown in Figs. 4 and 5, the thrust of the end E is at right angles to the opposed abutting faces 1' and 2' to prevent distortion and insure a reliable clamping and supporting of the conduit.

I provide an apertured plate like washer 5 of suitable metal adapted to lie against the outer face of the end E. The fastening F passes through this washer and its head F' bears thereon. Flanges 6 of the washer 5 overlie and closely engage the longitudinal edges of the ends D and E to hold said ends in alignment. The lower or inner edge portion of the washer 5 is curved as at 7 to conform to and lie against the curved surface 4. This washer serves as a wear plate to protect the plastic end E and also reinforces the clips adjacent the end portions thereof.

It is seen that the enlargements 1 and 2 provide on the opposed surfaces of the end portions D and E, angular faces adapted to abut one another and reinforce the end portions and contiguous loop portions so as to prevent the clamping strain from damaging or distorting the clip. Portions of these angular faces (the surfaces 1' and 2') extend radially of the loop portion while the other portions (the inner surfaces of the ends D and E) extend tangentially of the loop.

It should be noted that the abutting faces 1' and 2' operate to prevent the ends 1 and 2 from being twisted out of registry with one another and other distortion of the clip during the tightening of the bolt or screw. The flanges 6 also prevent the ends 1 and 2 from being twisted out of alignment and the clip from being otherwise distorted when the screw or bolt is tightened as aforesaid.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a conduit supporting clip, a plastic strap formed with a conduit-embracing loop portion, relatively straight and apertured end portions extending from said loop portion and adapted to be secured to the frame structure of an aircraft, and thickened reinforcing portions provided at the junctures of said loop and end portions and having opposed surfaces adapted to abut one another when said end portions are brought together, said opposed surfaces extending substantially radially of said loop portion when said ends are brought together and said end portions extending tangentially from said loop portion.

2. In a conduit supporting clip, a flexible and substantially form-retaining strap formed of a plastic material which has been extruded to provide a flexible conduit embracing loop portion and apertured end portions projecting outwardly from the loop portion, said end portions being movable apart to open the loop for applying it to a conduit and movable back into contact with one another to close said loop and to receive a fastening for clamping the strap on the conduit and securing it to a support; and inwardly projecting portions which thicken the clip at the junctures of said end portions and said loop and having opposed angularly disposed faces adapted to abut along substantially the mid-width of said thickened part when the end portions are secured together.

3. In a conduit supporting clip, a plastic strap formed with a conduit-embracing loop portion, apertured end portions extending from said loop portion to be secured to a support and having abuttable inner faces, and thickened reinforcing portions provided at the junctures of said end portions and loop, each of said thickened portions having a flat face abuttable against that of the other when said end portions are brought together; the aforesaid face of said apertured end portions each being angularly related to the face at that side of the clip which is located at the aforesaid thickened portion of the clip.

HERMAN RAY ELLINWOOD.